US011873792B2

(12) United States Patent
Lenssen

(10) Patent No.: US 11,873,792 B2
(45) Date of Patent: Jan. 16, 2024

(54) PLATFORM FOR A TOWER OF A WIND TURBINE AND WIND TURBINE

(71) Applicant: Siemens Gamesa Renewable Energy A/S, Brande (DK)

(72) Inventor: Matthias Lenssen, Hamburg (DE)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/848,571

(22) Filed: Jun. 24, 2022

(65) Prior Publication Data

US 2023/0014005 A1    Jan. 19, 2023

(30) Foreign Application Priority Data

Jul. 15, 2021 (EP) ..................................... 21185816

(51) Int. Cl.
*F03D 13/20* (2016.01)
*F03D 80/80* (2016.01)

(52) U.S. Cl.
CPC ............. *F03D 13/20* (2016.05); *F03D 80/80* (2016.05); *F05B 2240/912* (2013.01)

(58) Field of Classification Search
CPC ..... F03D 13/20; F03D 80/80; F05B 2240/912
See application file for complete search history.

(56) References Cited

U.S. PATENT DOCUMENTS

| 2011/0138707 | A1* | 6/2011 | Bagepalli | ................ E04H 12/16 52/223.13 |
| 2013/0233655 | A1* | 9/2013 | Peacock | .................. B66B 19/00 187/414 |
| 2015/0292263 | A1* | 10/2015 | Hierl | ....................... E04G 5/007 182/128 |
| 2016/0108896 | A1* | 4/2016 | Jane Panella | ........... E04H 12/34 52/745.21 |

(Continued)

FOREIGN PATENT DOCUMENTS

| CN | 107697818 A | 2/2018 |
| CN | 209277665 U | 8/2019 |

(Continued)

OTHER PUBLICATIONS

KR-101676202-B1 (Yong, Lee, Nov. 2016) English Translation (Year: 2023).*

(Continued)

*Primary Examiner* — Justin D Seabe
*Assistant Examiner* — Aye S Htay
(74) *Attorney, Agent, or Firm* — Schmeiser, Olsen & Watts LLP

(57) ABSTRACT

A platform for a tower of a wind turbine is provided, wherein the platform is adapted for a hanging arrangement inside the tower and includes at least one support for supporting the platform in a horizontal direction against a tower wall, wherein the support includes a foot section for contacting the tower wall, an abutment section attached to the platform, and a pretensioner, wherein the pretensioner preloads the (Continued)

Figure 1:
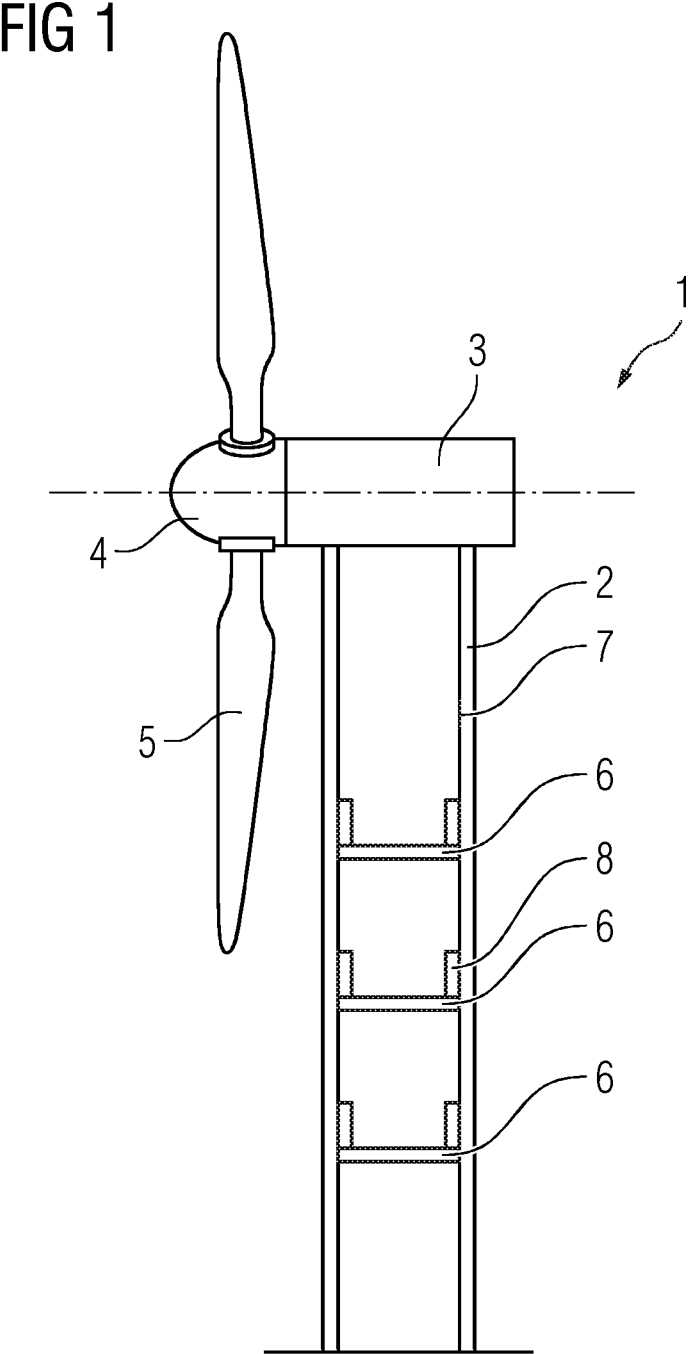

foot section against the abutment section with a pretension force directed towards the tower wall, wherein the foot section is moveable at least sectionally towards the platform when a force directed towards the platform and acting on the foot section exceeds the pretension force.

19 Claims, 5 Drawing Sheets

(56) References Cited

U.S. PATENT DOCUMENTS

| | | | |
|---|---|---|---|
| 2017/0218652 A1* | 8/2017 | Neighbours | E04H 12/341 |
| 2017/0261130 A1 | 9/2017 | Bernert et al. | |
| 2018/0106061 A1* | 4/2018 | Kersten | E04C 5/16 |
| 2020/0199894 A1* | 6/2020 | Soerensen | E04G 3/305 |

FOREIGN PATENT DOCUMENTS

| | | |
|---|---|---|
| DE | 102010008639 A1 | 8/2011 |
| EP | 3670784 A1 | 6/2020 |
| JP | 2007040317 A | 2/2007 |
| JP | 2021139317 A | 9/2021 |
| KR | 10-1676202 B1 | 11/2016 |
| KR | 101676202 B1 * | 11/2016 |
| KR | 101864525 B1 | 6/2018 |

OTHER PUBLICATIONS

European Search Report dated Dec. 16, 2021 for application No. 21185816.2.

* cited by examiner

PLATFORM FOR A TOWER OF A WIND TURBINE AND WIND TURBINE

CROSS-REFERENCE TO RELATED APPLICATIONS

This application claims priority to EP Application No. 21185816.2, having a filing date of Jul. 15, 2021, the entire contents of which are hereby incorporated by reference.

FIELD OF TECHNOLOGY

The following relates to a platform for a tower of a wind turbine, wherein the platform is adapted for a hanging arrangement inside the tower and comprises at least one supporting means for supporting the platform in a horizontal direction against a tower wall. Furthermore, the following relates to a wind turbine.

BACKGROUND

In the interior of a wind turbine tower, one or more platforms may be provided to enable the arrangement of wind turbine components at one or more levels inside the tower. The platforms may be attached to the tower wall, for instance in a hanging arrangement, in which the platforms are suspended from the tower wall. Such a hanging arrangement may require restricting the horizontal movement of the platform inside the tower. In this context, it is known to use machine feet mounted on the platform, which are pushing horizontally against the tower wall.

In KR 10-1676202 B1, a platform for a wind turbine tower arranged in a hanging arrangement is described. The platform comprises a plurality of supporting structures that support the platform horizontally against the inner wall of the tower. Therefore, the supporting structures comprise each a pressing part, which is pressed against the tower wall using a spring arranged between the edge of the platform and the pressing part.

SUMMARY

An aspect relates to a platform for a wind turbine which allows an improved supporting of the platform on the tower wall.

Accordingly, this problem is solved by a platform as initially described, wherein the supporting means comprises a foot section for contacting the tower wall, an abutment section attached to the platform, and a pretension means, wherein the pretension means preloads the foot section against the abutment section with a pretension force directed towards the tower wall, wherein the foot section is moveable at least sectionally towards the platform when a force directed towards the platform and acting on the foot section exceeds the pretension force.

The pretension means pretensions the foot section against the abutment section. The pretension means may be compressible and arranged at least partly compressed in an unloaded state of the supporting means. In particular, the pretension means may be further compressible to absorb loads exceeding the pretension force.

The abutment section is attached to the platform, so that the pretension means for instance presses the foot section against the abutment section with a pretension force that is directed towards the adjacent inner wall of the tower. The foot section may protrude at least partly from an edge of the platform. In particular, the protruding part of the foot section is moveable towards the adjacent edge of the platform, or the entire foot section may be movable towards the center or a center portion of the platform, respectively. Therefore, the supporting means is compliant and/or at least partly retractable, wherein the foot section is retracted when a force acting on the foot section from the tower wall exceeds the pretension force.

The pressing of the foot section against the abutment section causes a pretension force, which has to be exceeded by a force acting from the tower wall on the foot section before a movement of the foot section and/or a compression of the pretension means, or the like becomes possible. This has the advantage that the supporting means, or the platform supported by one or more of the supporting means, respectively, shows a stiff behaviour when loads acting on the foot sections are below the pretension force.

In an embodiment, the inherent stiffness of the supporting means for forces, or loads, respectively, below the pretension force prevents the platform from moving in a normal operation, in which no load peaks occur. A flexibility also in normal operations, when only small forces are acting from the tower wall on the supporting means, would allow for an oscillation of the platform making it unsafe to walk or work on the platforms. Furthermore, such a permanent oscillation or movement of the platform may cause fatigue issues between the platforms and adjacent constructions, for instance ladders, supporting struts and other structures mounted between one or more platforms and/or further sections of the wind turbine.

Therefore, the supporting means is only compliant for forces or loads, respectively, which are exceeding the pretension force, so that the supporting means protects the platform from being damaged when higher loads, or load peaks, respectively, are acting from the tower wall on the foot section of the supporting means. This compliance of the supporting means arranged between the platform and the tower wall helps reducing extreme loads that cause a large horizontal acceleration of the platform. Due to the inertia of the platform and its suspended nature, such accelerations may result in high loads to be transferred through the supporting means. In case of permanently stiff supporting means, these loads would be transferred in the platform itself straining the constructions mounted on the platforms like electrical cabinets, cable trays and guides or the like.

Providing the pretension force has the advantage that the platform is protected from high load peaks. This reduces the amount of material required for fabricating the platform since it may be constructed for lower maximum loads that have to be taken by the platform. In an embodiment, the platform according to the invention may be manufactured with less material and parts and/or with a smaller amount of supporting structures, which may reduce the costs of manufacturing. Furthermore, also the weight of the platform may be reduced facilitating transport and installation of the platform.

The pretension means preloading the foot section against the abutment section enables the supporting means to act stiff in normal operation, but compliant under extreme loads, so that the platform is completely stabilized in normal operation of the wind turbine. At the same time, the transfer of extreme loads into the platform is avoided reducing the requirements for the supporting means, the platform and the further constructions mounted on the platform.

In an embodiment, the platform comprises a plurality of supporting means, wherein the supporting means are arranged around the circumference of the platform. In particular, the platform may be circular so that it comprises a circular outer circumference. However, also other shapes of the platform like rectangular, quadratic and so on are possible, depending on the cross-sectional geometry of the tower of the wind turbine, in which the platform is to be arranged.

By providing a plurality of supporting means, the platform may be supported all around its outer circumference in order to take horizontal loads in any direction. In particular, the supporting means may be distributed equidistantly around the circumference of the platform. For example, on a circular platform comprising three supporting means, the supporting means may be spaced in steps of 120° around the circular outer circumference.

In an embodiment, the abutment section comprises a U-shaped bracket encompassing at least partly the pretension means and a part of the foot section, wherein the pretension means presses a plate section of the foot section against the U-shaped bracket. In particular, the foot section is arranged between the legs of the U-shaped bracket. The foot section may be considered as an inner bracket of the U-shaped bracket, or of the abutment section, respectively.

The pretension means presses the plate section of the foot section in particular against the middle section of the U-shaped bracket, wherein a portion of the foot section protruding from the middle section of the U-shaped bracket in direction of the tower wall is connected, or in direct contact, respectively, with a portion of the inner tower wall. At the opposing side, the legs of the U-shaped bracket may be attached to the platform either directly or by one or more further portions of the abutment section. The plate section may be a flat plate or it may be a portion of a section with a more complex geometry.

In an embodiment, the foot section comprises a rod which extends at least between the plate section and a base of the foot section for contacting the tower wall. The plate section may be distanced from the base, wherein both the base and the plate section may be firmly connected to the rod, or casted in one piece with the rod, respectively.

In an embodiment, the rod extends through an orifice in the plate section, wherein the length of a portion of the foot section protruding from the abutment section towards the tower wall is adjustable.

In an embodiment, the rod comprises a threaded section which extends through the orifice. The threaded section may be attached to the plate section by at least two nuts engaging the threaded section. This allows to adjust the length of the foot section which protrudes from the abutment section, in particular from the middle section of the U-shaped bracket of the abutment section. By adjusting the length that the foot section protrudes from the abutment section, a small gap between the platform and the inner wall of the tower may be bridged. In particular, it may be possible that the rod section may be adjusted to protrude between 1 cm and 20 cm from the side of the abutment section that is directed to the neighbouring inner tower wall, or the adjacent portion of the inner tower wall, respectively.

In an embodiment, the pretension means comprises a spring, in particular a coil spring, a leaf spring, a disk spring, or a gas spring, and/or a compressed elastic member. In an embodiment, the pretension means may comprise a helical coil spring which is at least partly arranged around the rod section of the foot section. A pretension means comprising a compression spring and/or a compressed elastic member may press the foot section against the abutment section for causing the pretension force. Furthermore, when a load acting on the foot section exceeds the pretension force, a further compression of the pretension means is possible so that load peaks may be damped and/or at least partly absorbed by the supporting means, or its pretension means, respectively.

In an embodiment, the pretension means is adjustable, wherein the pretension force depends on the adjustment of the pretension means. For instance, a spring of a pretension means may be adjusted by provided an adjustable compression of the spring in the pretension state of the pretension means, or the unloaded state of the supporting means, respectively. A gas spring of a pretension means may be adjusted for instance by varying the gas pressure of the gas spring. Also, an elastic member may be provided with a different compression in the pretension state of the pretension means.

In an embodiment, the supporting means comprises at least one guiding means for guiding the movement of the foot section towards the platform. The guiding means allows for guiding the foot section when the pretension means is compressed due to a load acting on the foot section and exceeding the pretension force. The foot section may be guided linearly so that its movement is restricted to a lateral movement, in particular towards the edge and/or the center of the platform.

In an embodiment, the guiding means is a slot in the abutment section, wherein a protrusion of the foot section engages in the slot. In particular, the guiding means may be slot in a leg of a U-shaped bracket of the abutment section. In the slot, a protrusion of the foot section, for instance a protrusion of the plate section of the foot section, may engage. It is possible that both legs of the U-shaped bracket comprise a slot as guiding means.

In an embodiment, the platform comprises a plurality of attachment means, wherein the attachment means are arranged around the circumference of the platform. The attachment means may be for instance attachment struts, wherein the end of each strut opposite to the platform is attachable to a tower wall. This allows for arranging the platform in a hanging arrangement in the interior of a tower.

A wind turbine according to an embodiment of the invention comprises at least one platform according to an embodiment of the invention. In particular, the wind turbine may comprise a plurality of platforms, which are arranged in the interior of a hollow tower of the wind turbine. For instance, the wind turbine may comprise between one and ten, for instance six, platforms in the interior of the tower.

All details and advantages described in relation to the platform according to the invention apply correspondingly to the wind turbine according to the invention and vice versa.

BRIEF DESCRIPTION

Figure 2:
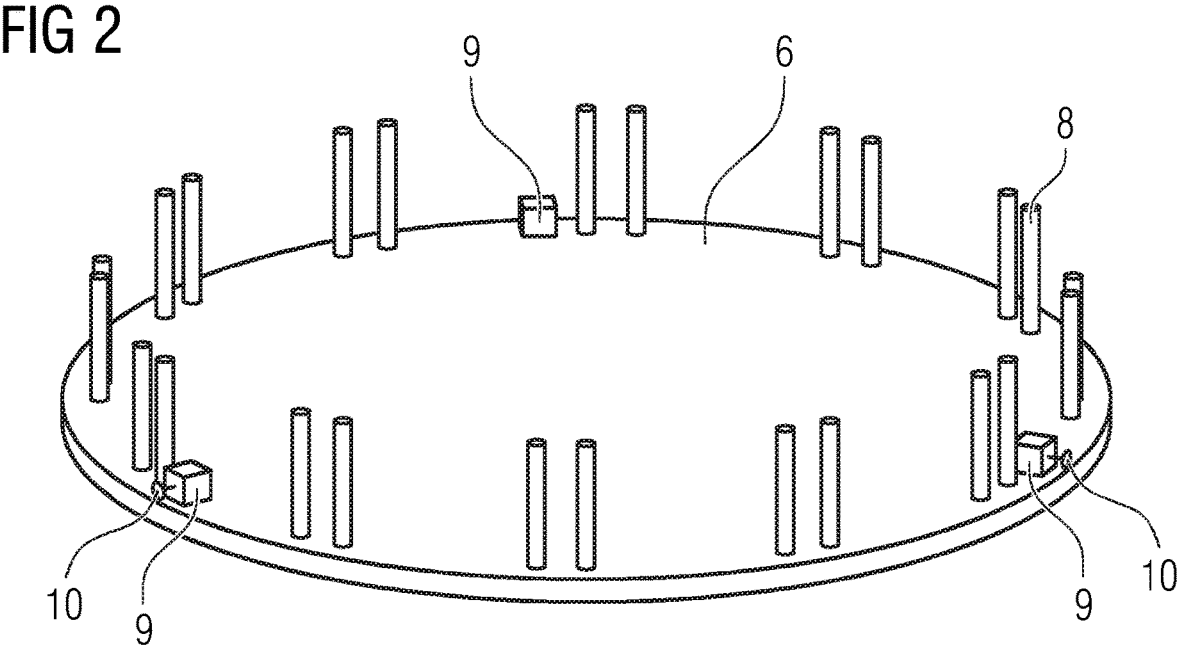
Figure 3:
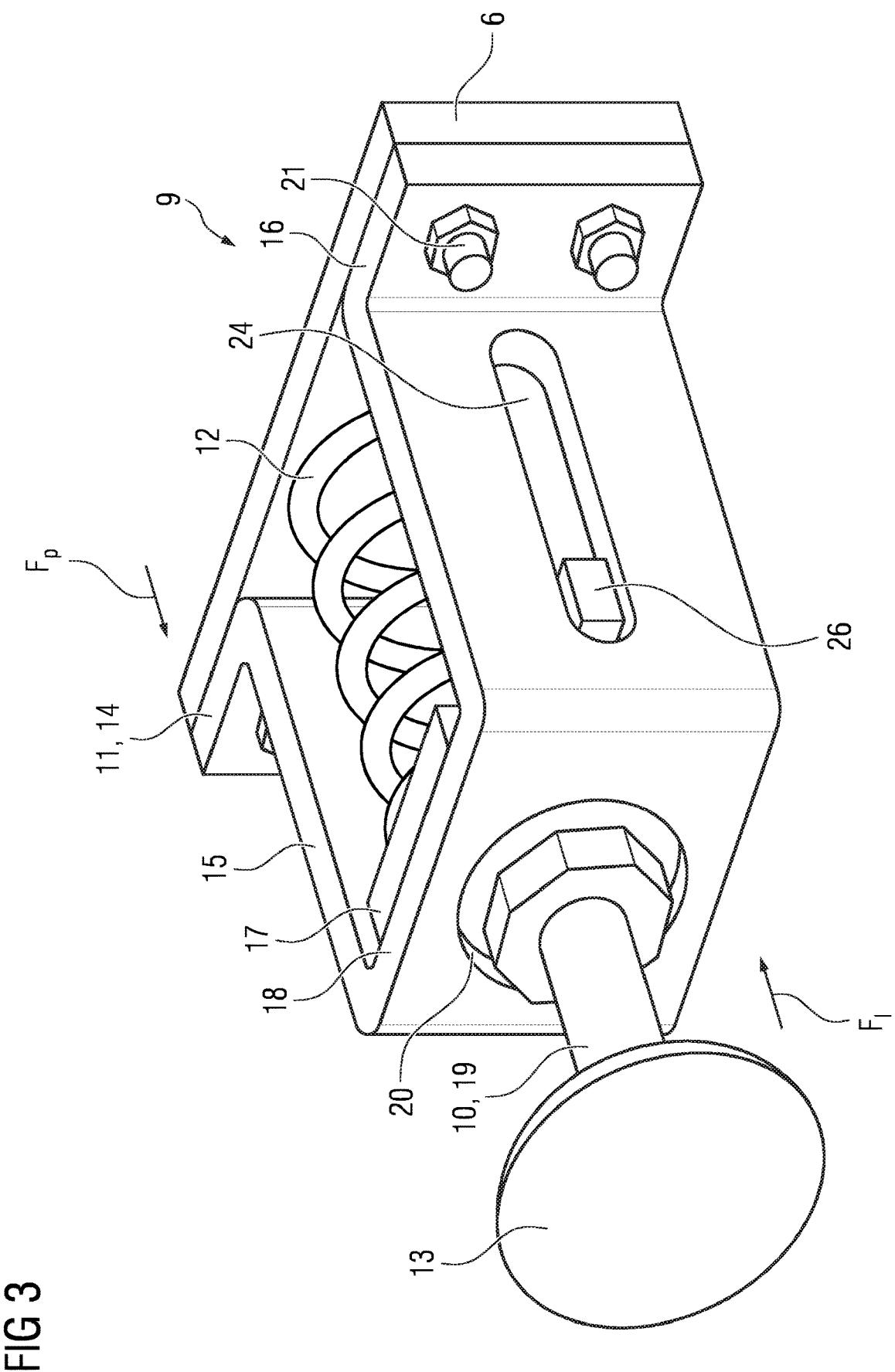
Figure 4:
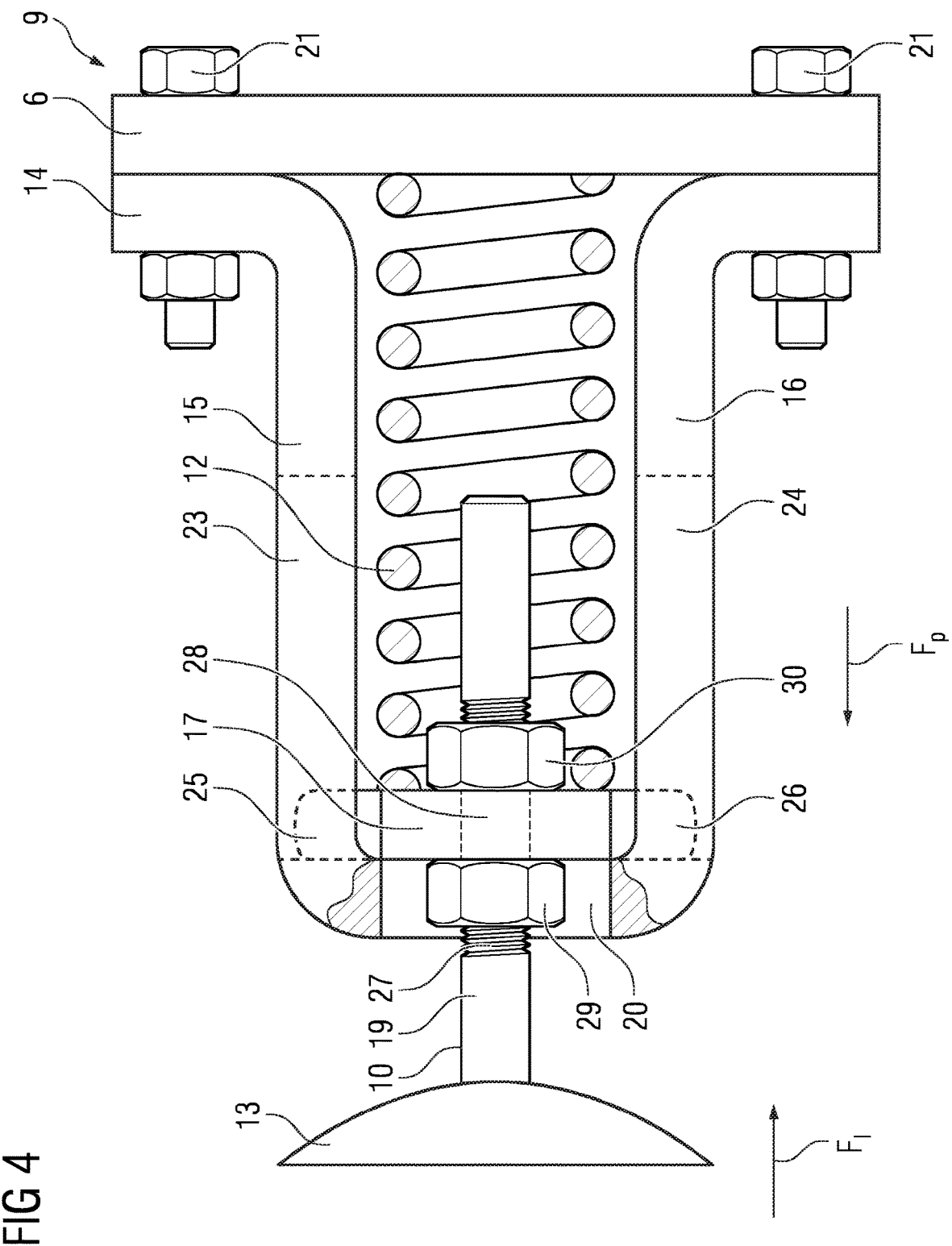
Figure 5:
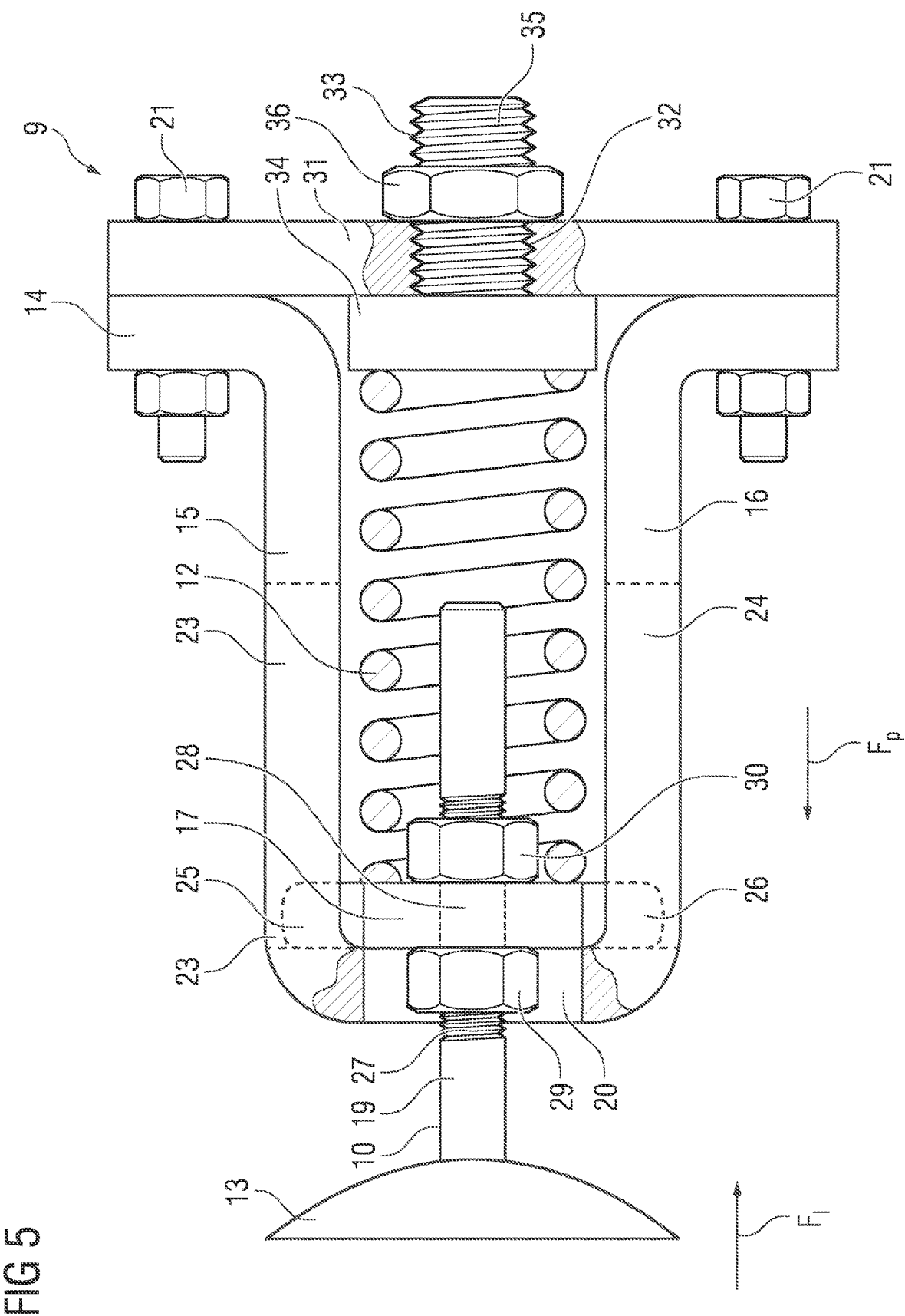

Some of the embodiments will be described in detail, with reference to the following figures, wherein like designations denote like members, wherein:

FIG. 1 an embodiment of a wind turbine according to the invention;

FIG. 2 an embodiment of a platform according to the invention;

FIG. 3 a perspective view of a first embodiment of a supporting a platform according to the invention;

FIG. 4 a top view on the first embodiment of the supporting a platform according to the invention; and FIG. 5 a top view on a second embodiment of a supporting a platform according to the invention.

DETAILED DESCRIPTION

In FIG. 1, an embodiment of a wind turbine 1 is shown. The wind turbine 1 comprises a tower 2, which supports a nacelle 3 of the wind turbine 1. The nacelle 3 bears a hub 4, to which a plurality of rotor blades 5 of the wind turbine 1 is attached. In the interior of the tower 2, a plurality of platforms 6 is arranged. The platforms 6 are arranged hanging inside the tower 2, wherein the platforms 6 are attached to an inner tower wall 7 by a plurality of attachment means or attachment 8. The attachment between the attachment means 8 and the inner wall 7 of the tower 2 occurs at the ends of the attachment means 8 distanced from the surface of the platforms 6, so that the platforms 6 are arranged each in a hanging arrangement in the interior of the tower 2.

In FIG. 2, an embodiment of a platform 6 is shown. The platform 6 comprises a plurality of attachment means 8, which are arranged around the outer circumference of the circular platform 6. The attachment means 8 are provided as attachment struts, which are arranged pairwise equidistantly around the outer circumference of the circular platform 6. It is possible that the platform 6 comprises a different shape, a different number of attachment means 8 and/or a different arrangement of the attachment means 8 on the platform 6.

To allow for supporting the platform 6 in horizontal direction against the inner tower wall 7, the platform 6 comprises a plurality of supporting means or support 9. Each of the supporting means 9 comprises a foot section 10 which contacts the tower wall 7 in a portion directly adjacent to the supporting means 9. By the supporting means 9, a horizontal support of the platform 6 inside the tower is obtained.

The supporting means 9 are arranged around the outer circumference of the platform 6. The supporting means 9 may be arranged equidistantly around the circumference. Also, another distribution of the supporting means 9 around the circumference is possible. In this embodiment, the platform 6 comprises three supporting means, which are each arranged offset by 120° of the circular circumference of the platform 6.

In FIG. 3, a first embodiment of a supporting means 9 is shown in a perspective view. The supporting means 9 comprises the foot section 10 for contacting the tower wall 7, an abutment section 11, which is attached to the platform 6, and a pretension means or pretensioner 12, which preloads the foot section 10 against the abutment section 11. In this embodiment, the pretension means is provided as a helical coil spring. The pretension means 12 preloads the foot section 10 against the abutment section 11 with a pretension force $F_p$ directed towards the tower wall 7, or directed towards a base 13 of the foot section 10, respectively.

The abutment section 11 comprises a U-shaped bracket 14, which encompasses the pretension means 12 and a part of the foot section 10. The U-shaped bracket 14 comprises two legs 15, 16, wherein the pretension means 12 and a portion of the foot section 10 are arranged in between the legs 15, 16. The pretension means 12 presses a plate section 17 of the foot section 10 against a middle portion 18 of the U-shaped bracket 14. The plate section 17 is attached to a rod 19 of the foot section 10, wherein the rod 19 extends through an orifice 20 in the abutment section 14, in particular in the middle section 18 of U-shaped bracket 14. In this embodiment, the abutment section 14 is attached to the platform 6 by a plurality of screws 21. The foot section 10 forms an inner bracket to the U-shaped bracket 14.

The pretension force $F_p$ presses the plate section 17 of the foot section 10 against the middle portion 18 of U-shaped bracket 14, or the abutment section 11, respectively. When a load force $F_l$ from the tower wall 2 is acting on the foot section 10, first the pretension force $F_p$ has to be exceeded before a further compression of the pretension means 12 and hence a movement of the foot section 10 occurs. This provides a stiff support of the platform 6 on the inner wall 7 of the tower 2 for forces $F_l$ below the pretension force $F_p$.

For loads $F_l$ exceeding the pretension force $F_p$, a compliant support of the platform 6 is obtained. The portion of the higher loads $F_l$, which exceed the pretension force $F_p$, may be absorbed at least partly by a further compression of the pretension means 12 and the corresponding movement of the foot section 10. The compression of the pretension means 12 causes a retraction of the moveable foot section 10 towards the edge of the platform 6, or towards a center portion of the platform 6, respectively.

For guiding of this retraction movement, the supporting means 9 comprises two guiding means or guide 22. The guiding means 22 each comprise a slot 23, 24 arranged in one of the legs 15, 16 of the U-shaped bracket 14. The plate section 17 of the foot section 10 comprises two protrusions 25, 26, which each engage in one of the slots 23, 24.

In FIG. 4, a top view of the supporting means 9 is shown. The rod section 19 of the foot section 12 comprises a threaded section 27, which extends through an orifice 28 in the plate section 17. To the threaded section 27, two nuts 29, 30 are attached to allow for adjusting the length of the foot section 10. In particular, the length of the portion of the foot section 10 which protrudes from the edge of the platform 6 towards the inner tower wall 7 may be adjusted. This allows for bridging differently sized gaps between the tower wall 7 and the platform 6. The foot section 10 may be adjustable for instance to protrude between 1 cm and 20 cm from the middle section 18 of the U-shaped bracket 14 towards the inner tower wall 7.

The U-shaped bracket 14 of the attachment portion 11 may be attached directly to the platform 6. It is possible that on the top surface and/or on the bottom surface of the platform 6 attachment structures are provided, to which the attachment portion 11, or the U-shaped bracket 14, respectively, are attached.

In FIG. 5, a second embodiment of a supporting means 9 is shown. In this embodiment, the attachment portion 11 comprises a base plate 31, which is attached to the platform 6. The base plate 31 is connected to the U-shaped bracket 14 by the screws 21.

The base plate 31 comprises an orifice 32 with an inner thread, through which an adjustment means 33 of the supporting means 9 extends. The adjustment means or adjustment 33 comprises a plate section 34, which is in direct contact with the pretension means 12. Furthermore, the adjustment means 33 comprises a threaded portion 35, which protrudes through the orifice 32 and which engages in the inner thread of the orifice 32. The adjustment means 33 allows for adjusting the pretension force $F_p$ of the pretension means 12 by moving the base plate 31 closer to the middle section 18 of the U-shaped bracket 14. This increases the initial compression of the pretension means 12 and therefore the force $F_p$ in the unloaded state of the supporting means 9. For further fixating the position of the adjustment means 33, one or more nuts 36 may be attached to the threaded portion 35.

In addition, or as an alternative to the coil spring, also other types of pretension means 12 may be used. It is also possible to use a pretension means which comprises a leaf spring, a disk spring, a gas spring, or a combination of these types of springs. Additionally, or alternatively, also the usage of a compressed elastic member as pretension means 12 is possible. An adjustment of the pretension force $F_p$ may also occur by other types of pretension means 12 as discussed in relation to the second embodiment. When a gas spring is used, also an adjustment by adjusting the gas pressure in the gas spring is possible.

By the pretension means 12, in particular a pretension force between 1 kN and 100 kN, in particular between 5 kN and 25 kN, for instance a force of 10 kN, is applied. This allows for a stiff arrangement of the platform 6 in the interior of the tower 2 under normal load conditions of the wind turbine 1.

When higher loads occur, for instance due to increased wind-induced movement of the tower 2, the pretension force $F_p$ is exceeded, so that the pretension means 12 is partly compressed and the foot section 10 moves at least sectionally towards in the direction of the platform 6. In an embodiment, the absorbance of high load peaks by the supporting means 9 allows for reducing the amount of material and/or supporting structures of the platform 6, so that the weight and the material required by the platforms 6 in the wind turbine 1 may be reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A platform for a tower of a wind turbine, wherein the platform is configured for a hanging arrangement inside the tower and comprises at least one support for supporting the platform in a horizontal direction against a tower wall, wherein the at least one support comprises a foot section for contacting the tower wall, an abutment section attached to the platform, and a pretensioner, wherein the pretensioner preloads the foot section against the abutment section with a pretension force directed towards the tower wall, wherein the foot section is moveable at least sectionally towards the platform when a force directed towards the platform and acting on the foot section exceeds the pretension force, and wherein the abutment section comprises a U-shaped bracket at least partly encompassing the pretensioner and a part of the foot section within the U-shaped bracket.

2. The platform according to claim 1, wherein the at least one support comprises a plurality of supports, wherein the plurality of supports are arranged around a circumference of the platform.

3. The platform according to claim 1, wherein the pretensioner presses a plate section of the foot section against the U-shaped bracket.

4. The platform according to claim 3, wherein the foot section comprises a rod which extends at least between the plate section and a base of the foot section for contacting the tower wall.

5. The platform according to claim 4, wherein the rod extends through an orifice in the plate section, wherein the length of a portion of the foot section protruding from the abutment section towards the tower wall is adjustable.

6. The platform according to claim 1, wherein the pretensioner comprises a spring and/or a compressed elastic member.

7. The platform according to claim 1, wherein the pretensioner is adjustable, wherein the pretension force depends on the adjustment of the pretensioner.

8. The platform according to claim 1, wherein the at least one support comprises at least one guide for guiding the movement of the foot section towards the platform.

9. The platform according to claim 8, wherein the at least one guide is a slot in the abutment section, wherein a protrusion of the foot section engages in the slot.

10. The platform according to claim 1, wherein the platform comprises a plurality of attachments, wherein the attachments are arranged around a circumference of the platform.

11. A wind turbine comprising:
a tower, and
a platform,
wherein the platform is configured for a hanging arrangement inside the tower and comprises at least one support for supporting the platform in a horizontal direction against a tower wall,
wherein the at least one support comprises a foot section for contacting the tower wall, an abutment section attached to the platform, and a pretensioner,
wherein the abutment section comprises a U-shaped bracket at least partly encompassing the pretensioner and a part of the foot section within the U-shaped bracket,
wherein the pretensioner preloads the foot section against the abutment section with a pretension force directed towards the tower wall, and
wherein the foot section is moveable at least sectionally towards the platform when a force directed towards the platform and acting on the foot section exceeds the pretension force.

12. A support for a platform of a wind turbine, comprising:
a foot section for contacting a tower wall of the wind turbine, an abutment section attached to the platform, and a pretensioner,
wherein the pretensioner preloads the foot section against the abutment section with a pretension force directed towards the tower wall,
wherein the foot section is moveable at least sectionally towards the platform when a force directed towards the platform and acting on the foot section exceeds the pretension force, and
wherein the abutment section comprises a U-shaped bracket at least partly encompassing the pretensioner and a part of the foot section within the U-shaped bracket.

13. The support according to claim 12, wherein the pretensioner presses a plate section of the foot section against the U-shaped bracket.

14. The support according to claim 13, wherein the foot section comprises a rod which extends at least between the plate section and a base of the foot section for contacting the tower wall.

15. The support according to claim 14, wherein the rod extends through an orifice in the plate section, wherein the length of a portion of the foot section protruding from the abutment section towards the tower wall is adjustable.

16. The support according to claim 12, wherein the pretensioner comprises a spring and/or a compressed elastic member.

17. The support according to claim 12, wherein the pretensioner is adjustable, wherein the pretension force depends on the adjustment of the pretensioner.

18. The support according to claim 12, wherein the support comprises at least one guide for guiding the movement of the foot section towards the platform.

19. The support according to claim 18, wherein the guide is a slot in the abutment section, wherein a protrusion of the foot section engages in the slot.

\* \* \* \* \*